No. 618,057. Patented Jan. 24, 1899.
W. A. CROWDUS.
SECONDARY BATTERY AND ELECTRIC LAMP.
(Application filed Nov. 22, 1897.)
(No Model.) 2 Sheets—Sheet 1.
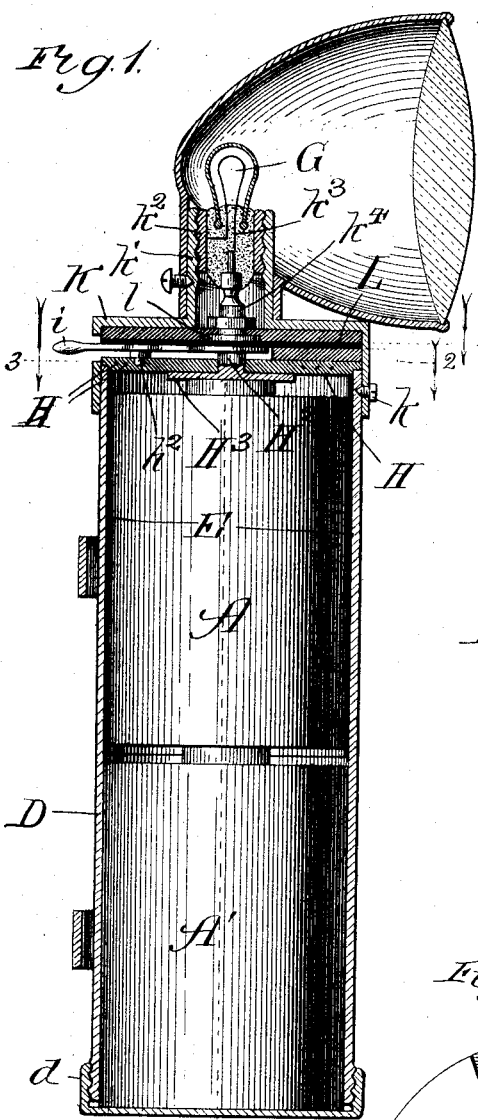
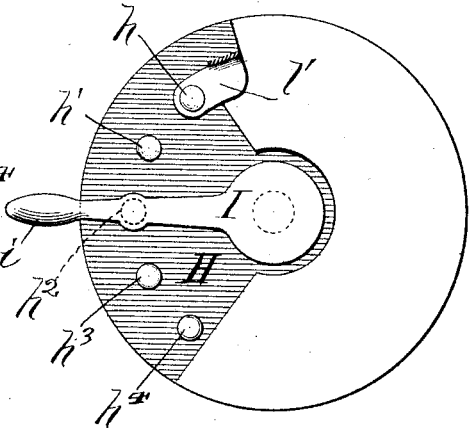
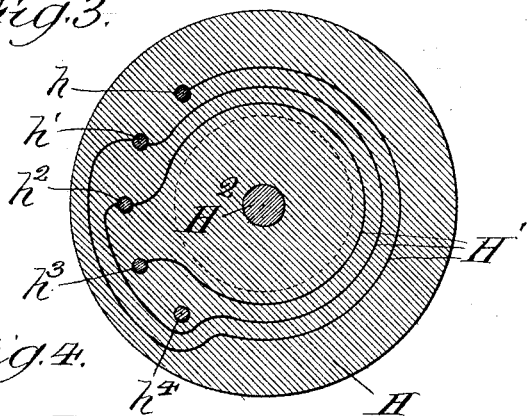
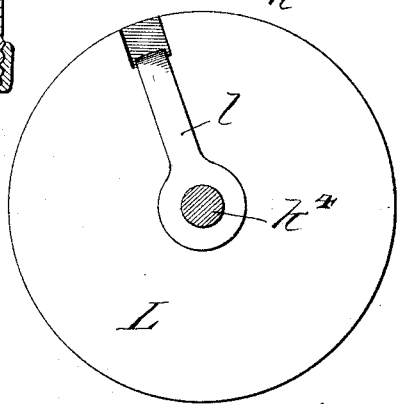
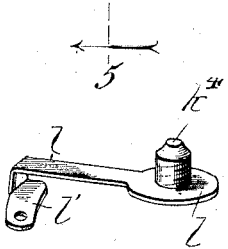
Witnesses:
Chas. E. Gaylord,
Luth. S. Alter
Inventor:
Walter A. Crowdus,
By Banning & Banning & Sheridan,
Attys.

No. 618,057. Patented Jan. 24, 1899.
W. A. CROWDUS.
SECONDARY BATTERY AND ELECTRIC LAMP.
(Application filed Nov. 22, 1897.)
(No Model.) 2 Sheets—Sheet 2.
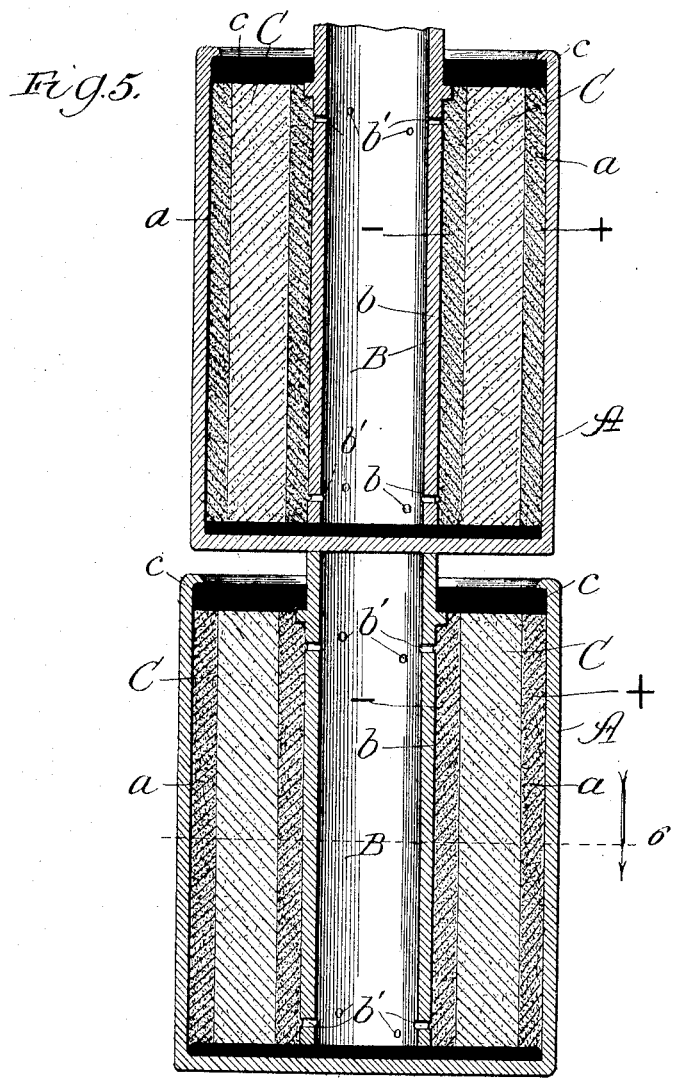
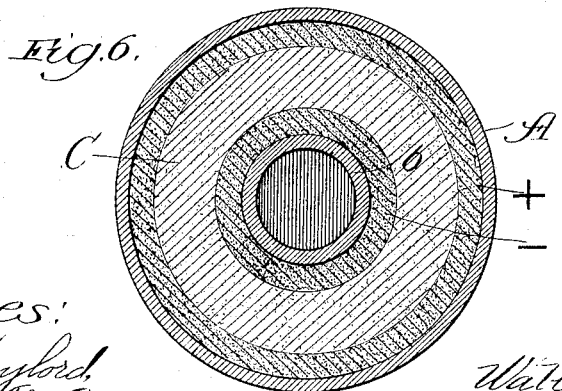

UNITED STATES PATENT OFFICE.

WALTER A. CROWDUS, OF CHICAGO, ILLINOIS.

SECONDARY BATTERY AND ELECTRIC LAMP.

SPECIFICATION forming part of Letters Patent No. 618,057, dated January 24, 1899.

Application filed November 22, 1897. Serial No. 659,484. (No model.)

*To all whom it may concern:*

Be it known that I, WALTER A. CROWDUS, a citizen of the United States, residing at Chicago, in the county of Cook and State of Illinois, have invented certain new and useful Improvements in Secondary Batteries and Electric Lamps Adapted to be Used in Connection Therewith, of which the following is a specification.

My invention relates to that class of secondary batteries known as the "lead element" and to mechanisms particularly adapted for this kind of a battery, so that it may be used in connection with what might be termed "electric vehicle-lamps."

The principal object of my invention is to provide a simple, economical, and efficient secondary battery.

A further object of my invention is to provide a simple, economical, and efficient secondary battery which may be used in series relation with each other and without the use of binding-posts or wires.

A further object of my invention is to provide a simple, economical, and efficient mechanism adapted to be used in connection with my battery for the purpose of forming a simple and efficient vehicle-lamp; and the invention consists in the features, combinations, and details of construction hereinafter described and claimed.

In the accompanying drawings, Figure 1 is a vertical sectional elevation of a vehicle-lamp constructed in accordance with my improvements and showing the batteries as they appear in use; Fig. 2, a plan view of the upper part of the battery-case with the lamp removed, taken on line 2 of Fig. 1 and showing the switch mechanism for cutting the battery in and out; Fig. 3, a cross-sectional view taken on the line 3 of Fig. 1; Fig. 4, a cross-sectional view taken on the line 4 of Fig. 1; Fig. 5, a vertical sectional elevation of the batteries, taken on the line 5 of Fig. 1; Fig. 6, a cross-sectional view taken on the line 6 of Fig. 5, and Fig. 7 a perspective view of a connecting-piece hereinafter described.

In constructing a battery in accordance with my improvements I provide a metallic case of lead A for the containing-cell and provide it with a centrally-located tube B, also made of lead. I form on the inner surface of the outer casing a lining of active material $a$, preferably formed of peroxid of lead. I then provide the outer surface of the inner tube with a coating of active material $b$, formed, preferably, of spongy lead, as the negative element of the battery. Between these two coatings of active material I insert a porous packing C of suitable material for receiving and holding in suspension the liquid electrolyte. This material may be made of a mixture of sawdust and plaster-of-paris or gelatinous material. I then close the battery by means of a cover $c$, formed of hard rubber, which serves to keep the central tube rigidly in position. An inspection of the drawings will show the central tube B, forming the opposite element of the battery and provided with a number of perforations $b'$ near the top and bottom, through which water or liquid may be introduced into the interior of the cell, it being well known in the art that all attempts heretofore to produce dry batteries have not been entirely successful in that the mixture gradually dries out to the extent that there is not left in suspension sufficient liquid electrolyte for the operation of the cell. My invention overcomes these defects and objections by making no attempt to hermetically seal or prevent evaporation and by providing a well or reservoir within the cell through which the electrolyte or liquid may be fed in when desired or needed, thus enabling the battery to be kept active for an indefinite period and also enabling a neglected and thoroughly dry cell to be restored to a perfect condition.

As above stated, my batteries are particularly adapted for use in connection with portable electric lamps, for the reason that there is no free liquid in the batteries and the batteries may be shaken or turned upside down and no liquid will leak out of the same, this being almost a necessary condition to a bicycle-lamp. To provide an electric lamp and intervening mechanism for use in connection with my battery, I provide an inclosing case D, formed, preferably, of metal. This casing is preferably in the shape of a circular tube having an opening at the bottom portion, which opening is provided with a screw-cap $d$. One of the batteries, A, is placed in with its projecting central metallic tube upward and also one, A', which is in all structural respects similar to the one above, placed underneath the same, so that this central metallic tube contacts with the lead case of the upper battery, thus forming electric connection between the negative element of the lower battery and the positive element of the upper battery. It will be noticed that the upper battery is prevented from electrically contacting the inclosing case by means of the tubular insulation E, which is inserted between it and the inner surfaces of the tube and is made as a lining to this tube.

To provide means for supplying current to the incandescent lamp G in the desired quantities, I provide the upper part of the inclosing case with an insulated cap H, which may be secured thereon in any manner and which has a resistance-coil H' (see Fig. 3) embedded in the same. This resistance-coil has a number of metallic pins or points $h$, $h'$, $h^2$, and $h^3$ projecting therefrom out through its upper surface. The central portion of this cap is provided with a flanged stud $H^2$, the flanged portion $H^3$ being arranged underneath the same, so as to be contacted by the central tubular projection of the battery, and, being made of metal, forms an electric contact. Rotatively mounted on this stud is a switch-lever I, having a handle $i$ outside of the casing, as shown particularly in Figs. 1 and 2. This switch-lever is so arranged that when it is moved from one point to the other it closes the electric circuit between the resistance-coil, as hereinafter described for the battery, and the negative element of the upper battery. The point $h^4$ is not connected with the resistance-coil. Consequently when the lever rests thereon the battery is open.

A metal cap K is secured to the metallic case at $k$ by means of a set-screw or securing-screw, though it may be soldered, if desired, and consequently forms an electric connection with the positive element of the lower battery. This metallic cap is provided with a socket $k'$, into which the lamp is inserted, as shown in Fig. 1, and which forms one side of the circuit, so that current can flow from the positive element of the lower battery through the metal tubular casing D, through the cap K, socket $k'$, and by means of the terminal wire $k^2$ of the filament of the lamp to the opposite terminal $k^3$ of the filament to the stud $k^4$, which rests on an insulated plate L and which is electrically connected with a contacting strip $l$. (Shown in perspective view in Fig. 7.) Such contacting strip passes across the upper side of the plate, as shown in Fig. 4, and projects down on its outer end, where it is drawn back at $l'$ (shown particularly in Fig. 2) to form electrical connection with the terminal $h$, and the current will then flow across the switch-lever, down through the flanged stud $H^2$, to the negative element of the upper battery, thence through the electrolyte of the battery to the positive element of such battery, thence out through the lead casing of the upper battery to the negative element of the lower battery, completing the circuit.

The resistance-coil is shown particularly in Fig. 3, so that when the switch-lever rests on the terminal $h$ there is no resistance whatever and the full force of the current from the battery is supplied to the lamp. When the switch-lever is moved to the resistance-terminal $h'$, the current can flow from the battery through the switch-lever, thence through the terminal point $h'$ and around by the resistance-wire H' to the terminal $h$, thence through the lamp and back to the battery through the circuit above described. The movement of the switch to the next terminal $h'$ cuts in a larger amount of resistance. The movement of the switch to the next terminal $h^3$ cuts in all of the resistance, so that the least amount of current will be furnished the lamp. It will thus be seen that a variable amount of resistance may be interposed as desired by the movement of this switch-lever.

While I have described my invention with more or less minuteness as regards details and as being embodied in certain precise forms, I do not desire to be limited thereto unduly any more than is pointed out in the claims. On the contrary, I contemplate all proper changes in form, construction, and arrangement, the omission of elements, and the substitution of equivalents, as circumstances may suggest or necessity render expedient.

I claim—

1. In a secondary battery, the combination of a cylindrical lead containing-cell having its inner surface provided or coated with an active material forming one element, and a laterally-perforated centrally-located tubular opposing element of the battery open at the top and closed at the bottom to form a central well for the purpose of supplying liquid to the battery, substantially as described.

2. In a portable electric vehicle-lamp, the combination of a secondary battery formed of at least two cells arranged with their axis in a longitudinal line and provided with outer metallic containing-cells forming one element of the battery, a central metallic projecting element forming the other element of the battery arranged in series relation so that the outer casing of one cell contacts the centrally-projecting element of the next adjacent cell, an inclosing case for the cells having a metallic portion in contact with the casing of one end cell to complete the circuit for the battery, and an electric incandescent lamp electrically connected with the inclosing case and with the central terminal of the other end cell, substantially as described.

3. In a secondary battery, the combination of a metallic containing-cell with its inner surface coated or lined with active material forming one element of the battery, a laterally-perforated centrally-located tube or cup open at the top and closed at the bottom to form a well and supply liquid to the interior and provided with an annular coating on the outside thereof which forms the other element of the battery, and an absorbent surface located between said elements, substantially as described.

4. In an electric vehicle-lamp, the combination of an outer encircling metallic casing connected with one pole of the battery, an insulated cap on such casing provided with a contact-piece connected with the opposite pole of the battery, a switch electrically connected with the contact-piece, and a battery or series of batteries provided with metallic cups one of which electrically contacts the inclosing casing and the other the contact-piece of the insulated cover, substantially as described.

5. In an electric vehicle-lamp, the combination of an outer metallic casing connected with one pole of the battery, an insulated cover on such casing provided with a contacting stud electrically connected with the opposite pole of the battery, a switch electrically connected with such stud, a metallic cup or cover electrically connected with the outer casing and provided with a metallic socket, an incandescent lamp in such socket having one terminal electrically connected therewith, a second insulated piece inserted between the metallic cap and the insulated cover, a metallic strip connected with the opposite filament of the lamp and arranged to be electrically contacted with the switch so that the battery-circuit may be opened and closed, and a battery or sets of batteries provided with metallic cups or boxes one of which electrically contacts the metallic inclosing case and the other the contact-stud of the insulated cover, substantially as described.

6. In a portable electric lamp, the combination of a secondary battery formed of at least two cells arranged with their axes in a longitudinal line, each provided with a central projecting element arranged to contact the adjacent battery and establish electrical connection between the same, an outer inclosing casing for inclosing and protecting the batteries and provided with a metallic portion arranged to contact one or more of the batteries and establish a complete circuit for the battery, and an electric incandescent lamp electrically connected with the inclosing case and with the batteries for the purpose of furnishing light, substantially as described.

WALTER A. CROWDUS.

Witnesses:
   THOMAS B. MCGREGOR,
   BELLE W. BARRY.